350-333
XR 3,938,136
SR
05 D

United States Patent [19]
Kawakami
[11] 3,938,136
[45] Feb. 10, 1976

[54] METHOD AND DEVICE FOR DRIVING A MATRIX TYPE LIQUID CRYSTAL DISPLAY ELEMENT

[75] Inventor: Hideaki Kawakami, Hitachi, Japan
[73] Assignee: Hitachi, Ltd., Japan

[22] Filed: Jan. 4, 1974
[21] Appl. No.: 430,919

[30] Foreign Application Priority Data
Jan. 10, 1973 Japan .............................. 48-5182

[52] U.S. Cl. .................... 340/324 M; 350/160 LC
[51] Int. Cl.[2] ........................................ G06F 3/14
[58] Field of Search .......... 350/160 LC; 340/324 M, 340/336, 166 EL

[56] References Cited
UNITED STATES PATENTS 3,653,745 4/1972 Mao .............................. 340/324 M
3,654,606 4/1972 Marlowe et al. .............. 340/166 EL
3,824,580 7/1974 Bringol .......................... 340/324 M

*Primary Examiner*—Marshall M. Curtis
*Attorney, Agent, or Firm*—Craig & Antonelli

[57] ABSTRACT

A method and device for driving a matrix type liquid crystal display element, wherein an alternating voltage $\mp 1/6V_0$ of one-sixth times as great as a selected voltage $V_0$ is applied to a non-selected X line, an alternating voltage $\pm 1/6V_0$ opposite in phase to the alternating voltage applied to the non-selected X line is applied to a non-selected Y line, an alternating voltage $\pm \frac{1}{2}V_0$ opposite in phase to the alternating voltage applied to the non-selected X line is applied to a selected X line, and an alternating voltage $\mp \frac{1}{2}V_0$ opposite in phase to the alternating voltage applied to the selected X line is applied to a selected Y line, whereby an alternating voltage of $\pm V_0$ is applied to a selected dot at an intersection of the selected X and Y lines.

5 Claims, 5 Drawing Figures

3938136
OR IN 340/324M

METHOD AND DEVICE FOR DRIVING A MATRIX TYPE LIQUID CRYSTAL DISPLAY ELEMENT

The present invention relates to a method and device for driving a matrix type liquid crystal display element.

For a method for scanning the matrix type liquid crystal display element, there have been known a one point-at-a time method in which each intersection of columns and rows of the matrix is scanned in succession and a one line-at-a time method in which all intersections on either one line of the columns and rows in the matrix are simultaneously driven while each line is scanned in succession.

In a display system of the liquid crystal element, there are know transmissive type and reflective type systems. In the transmissive type system, the liquid crystal exhibits light transmissive nature upon the non-application of a certain voltage thereto but exhibits light scattering nature to become turbid upon the application of the certain voltage $V_0$ (hereinafter defined as a selected voltage) thereto. In this specification, the row and column of the matrix are defined as X and Y lines respectively, dots at the intersections of the selected X and Y lines are defined as selected dots, dots other than the selected dots on the selected X and Y lines are defined as half-selected dots, and dots on non-selected X and Y lines are defined as non-selected dots.

In the one line-at-a time method, the driving of the selected-dots to be turbid causes all the half-selected dots on the selected X line to be turned turbid and hence it is often impossible to selectively render only the predetermined dots turbid. The reason is that a cross talk voltage is applied to dots other than the selected dots because the liquid crystal display element has a bi-directional nature.

In order to remove the problem of the cross talk, an average cross talk voltage method is known which averages the cross talk voltage applied to the dots other than the selected dots.

One of the conventional methods is shown in TABLE 1 in which the voltage of $\pm V_0$ at the time of selection and the voltage of $\pm⅓V_0$ at the time of non-selection are applied to the X lines while the voltage of 0(V) at the time of selection and the voltage of $\pm⅔V_0$ at the time of non-selection are applied to the Y lines in order to apply the voltage of $\pm V_0$ to the selected dots, the voltage of $\pm⅓V_0$ to the half-selected dots and the voltage of $\mp⅓V_0$ to the non-selected dots, respectively.

TABLE 1

| X \ Y | Selected line 0(V) | Non-selected line $\pm 2/3V_0$ |
|---|---|---|
| Selected line $\pm V_0$ | $\pm V_0$ | $\pm 1/3V_0$ |
| Non-selected line $\pm 1/3V_0$ | $\pm 1/3V_0$ | $\mp 1/3V_0$ |

It is to be noted that signs $\pm$, $\mp$ preceding the voltage indicate a phase relation and the sign $\pm$ is opposite in phase to the sign $\mp$.

In this system, however, the application of the voltage of $\pm V_0$ to the X line at the time of selection causes the amplitude of the voltage to be $2V_0$ at the output stage of a driving circuit and generally imposes the requirement of a withstand voltage above $2V_0$ on a switching element.

In general, the voltage $V_0$ is of the order of 20 volts, and this fact leads to a great obstruction when the driving circuit is to be realized in the form of integrated circuits (IC) or large scale integrated circuits (LSI).

Accordingly, a primary object of the present invention is to provide a novel method for driving a matrix type liquid crystal display element which permits a withstand voltage to be reduced in a driving circuit and to provide a novel device employing such a method.

According to one aspect of the present invention, there is provided a method for driving a matrix type liquid crystal display element driven by the predetermined number of X lines and the predetermined number of Y lines, comprising the step of applying to a non-selected X line an alternating voltage $\mp 1/6V_0$ of one-sixth times as great as a voltage $V_0$ required for rendering the liquid crystal opaque, the step of applying to a non-selected Y line an alternating voltage $\pm 1/6V_0$ opposite in phase to the alternating voltage applied to the non-selected X line, the step of applying to a selected X line an alternating voltage $\pm ½V_0$ opposite in phase to the alternating voltage applied to the non-selected X line, and the step of applying to a selected Y line an alternating voltage $\pm ½V_0$ opposite in phase to the alternating voltage applied to the selected X line, whereby an alternating voltage of $\pm V_0$ is applied to a selected dot at an intersection of the selected X and Y lines to render the selected dot opaque.

According to another aspect of the present invention, there is provided a device for driving a matrix type liquid crystal display element driven by the predetermined number of X lines and the predetermined number of Y lines, comprising means for applying to a non-selected X line an alternating voltage $\mp 1/6V_0$ of one-sixth times as great as a voltage $V_0$ required for rendering the liquid crystal opaque, means for applying to a non-selected Y line an alternating voltage $\pm 1/6V_0$ opposite in phase to the alternating voltage applied to the non-selected X line, means for applying to a selected X line an alternating voltage $\pm ½V_0$ opposite in phase to the alternating voltage applied to the non-selected X line, and means for applying to a selected Y line an alternating voltage $\mp ½V_0$ opposite in phase to the alternating voltage applied to the selected X line, whereby an alternating voltage of $\pm V_0$ is applied to a selected dot at an intersection of the selected X and Y lines to render the selected dot opaque.

The present invention is characterized in that the alternating voltages of $\pm V_0/2$, $\pm V_0/6$ which are opposite in phase to each other are applied to the selected and non-selected lines and the voltage applied to the X lines is made opposite in phase to the voltage applied to the Y lines to render the selected dots opaque.

The voltages at the times of selection and non-selection of the X and Y lines in the present invention are shown in TABLE 2.

TABLE 2

| X \ Y | Selected line $\mp 1/2V_0$ | non-selected line $\pm 1/6V_0$ |
|---|---|---|
| Selected line $\pm 1/2V_0$ | $\pm V_0$ | $\pm 1/3V_0$ |
| Non-selected line $\pm 1/6V_0$ | $\pm 1/3V_0$ | $\mp 1/3V_0$ |

The above and other objects and features of the present invention will be understood when reading the following detailed description in conjunction of the accompanying drawings, in which.

Figure 1:
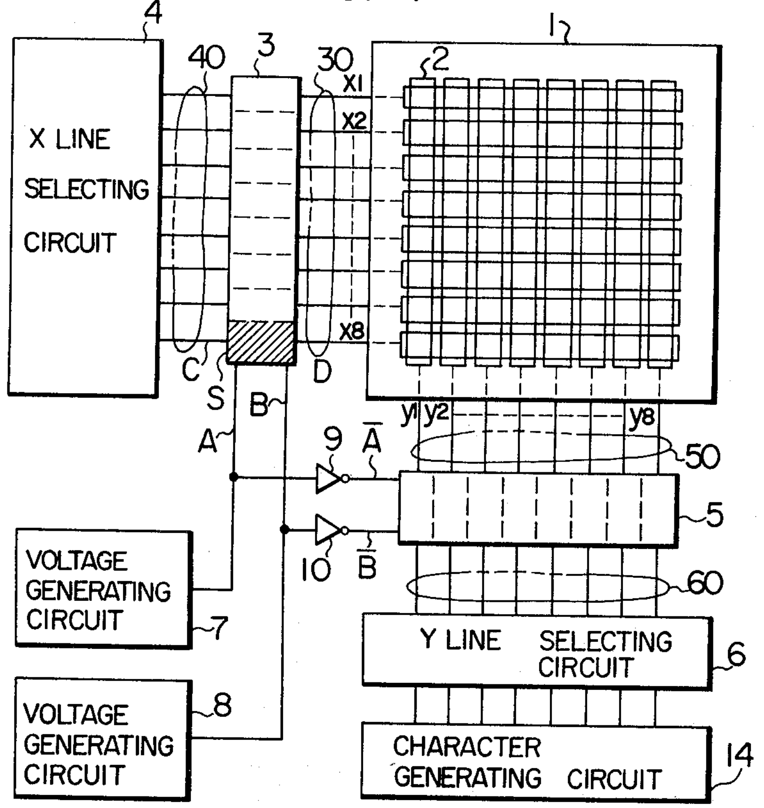
FIG. 1 is a circuit diagram showing one embodiment of the present invention.

FIG. 1 shows one embodiment of a circuit arrangement according to the present invention. In the figure, an 8 × 8 matrix liquid crystal element 1 comprises two glass plates on one of which transparent conductive films 2 such as Nesa (a trade name) are latterally arranged and on the other of which they are longitudinally arranged. The two glass plates are superimposed on each other with an insulating spacer disposed therebetween which is made, for example, of melted glass several microns to several tens microns thick. A usual nematic liquid crystal material is filled in a gap between the two glass plates.

In such an arrangement, matrix electrodes are formed on the upper and lower glass plates of the Nesa films 2, the intersections of which operate as image dots. These dots exhibit a transmissive nature upon the application of a low voltage thereto and become opaque upon the application of a voltage exceeding a certain level, that is, a threshold voltage. The voltage which renders the dot opaque is of the order of as much as 20 volts but depending upon the liquid crystal material. Such a liquid crystal display element serves as a character displaying device in copperation with a character generating circuit 14 as shown in FIG. 1.

An X line driving switch unit 3 selects outputs A and B from voltage generating circuits 7 and 8 in response to outputs 40 from an *x* line selecting circuit 4 and generates outputs on X lines 30. A Y line driving switch unit 5 selects outputs $\overline{A}$ and $\overline{B}$ generated through inverters 9 and 10 in response to outputs 60 from a Y line selecting circuit 6, and generates outputs on Y lines 50. The Y line selecting circuit 6, on the other hand, selects signals appearing on the Y lines due to selection in response to a character signal from a character generating circuit 14 in the case where the liquid crystal display element is constructed as a character displaying device.

Figure 4:
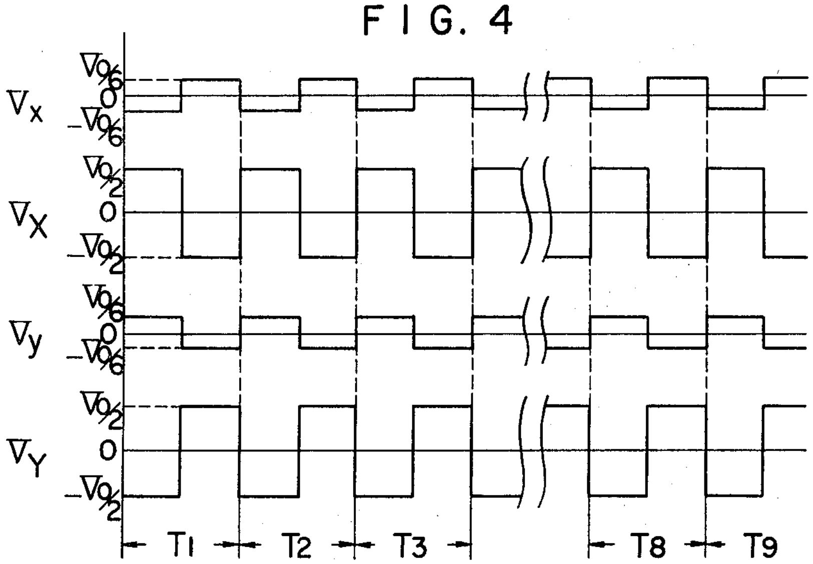
FIGS. 4 and 5 are waveforms for illustrating operations of the circuit in FIG. 1.

The output A from the voltage generating circuit 7 appears with a waveform as shown by $V_X$ in FIG. 4 which is an alternating voltage of $\pm \frac{1}{2} V_0$. The output B from the voltage generating circuit 8 appears with a waveform as shown by $V_x$ in FIG. 4 which is an alternating voltage of $\pm 1/6 V_0$. The outputs $\overline{A}$ and $\overline{B}$ from the inverters 9 and 10 which are applied to the *y* line driving switch unit 5 are opposite in phase to the outputs A and B and are the alternating voltages as shown by $V_Y$ and $V_y$ in FIG. 4.

Figure 2:
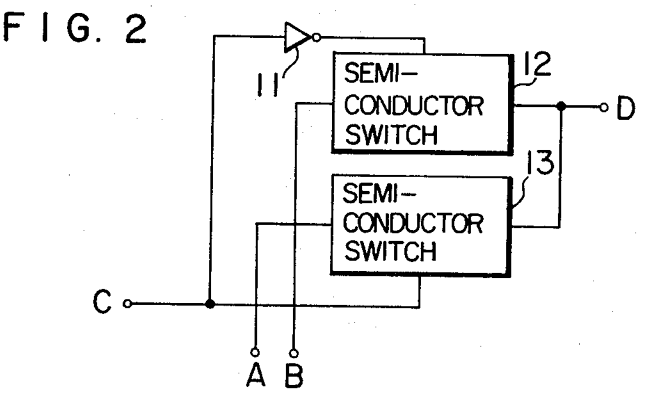
FIG. 2 is a particular circuit diagram showing one portion of FIG. 1.

FIG. 2 shows one embodiment of a switch portion S (hatched portion is FIG. 1) corresponding to one line of the X line driving switch unit 3.

In FIG. 2, reference numeral 11 is an inverter, and numerals 12 and 13 semiconductor switches. The semiconductor switch 13 is rendered conductive when an output C from the X line selecting circuit 4 is a logic "1" while the semiconductor switch 12 is rendered conductive through the inverter 11 when the output C is a logic "0". Accordingly, the switch portion generates an output D corresponding to the output A (the output from the voltage generating circuit 7) through the semiconductor switch 13 when the output C from the X line selecting circuit 4 is "1", and generates an output corresponding to the output B (the output from the voltage generating circuit 8) through the semiconductor switch 12 when the output therefrom is "0". If the output C of "1" is applied correspondingly to the selected X line and the output of "0" to the non-selected X line, then the output 30 from the X line driving switch unit 3 causes the alternating voltage $\pm V_0/2$ as shown by $V_X$ in FIG. 4 to be applied to the selected X line and the alternating voltage $\pm V_0/6$ such as $V_x$ opposite in phase to $\pm V_0/2$ to be applied to the non-selected X line. The Y line driving switch unit 5 includes similar elements and receives the voltages opposite in phase to the outputs A and B, so that the output 50 from the Y line driving switch unit 5 causes the alternating voltage of $\mp \frac{1}{2} V_0$ as shown by $V_Y$ in FIG. 3 to be applied to the selected Y line and the alternating voltage of $\pm 1/6 V_0$ such as $V_y$ opposite in phase to $\mp \frac{1}{2} V_0$ to be applied to the non-selected Y line.

As a result, the voltage applied to the selected dots disposed at the intersections of the selected X and Y lines is $$\pm \tfrac{1}{2} V_0 - (\mp \tfrac{1}{2} V_0) = \pm V_0,$$

the voltage applied to the half-selected dots on the selected X line is $$\pm \tfrac{1}{2} V_0 - (\pm 1/6 V_0) = \pm \tfrac{1}{3} V_0,$$

the voltage applied to the half-selected dots on the selected Y line is $$\mp 1/6 V_0 - (\mp \tfrac{1}{2} V_0) = \pm \tfrac{1}{3} V_0,$$

and the voltage applied to the non-selected dots is $$\mp 1/6 V_0 - (\pm 1/6 V_0) = \mp \tfrac{1}{3} V_0.$$

In other words, the application of the driving voltages having the waveform as shown in FIG. 4 causes the voltage $\pm V_0$ to be applied to the selected dots, the voltage $\pm \frac{1}{3} V_0$ to be applied to the half-selected dots and the voltage $\pm \frac{1}{3} V_0$ to be applied to the non-selected dots, respectively.

Figure 3:
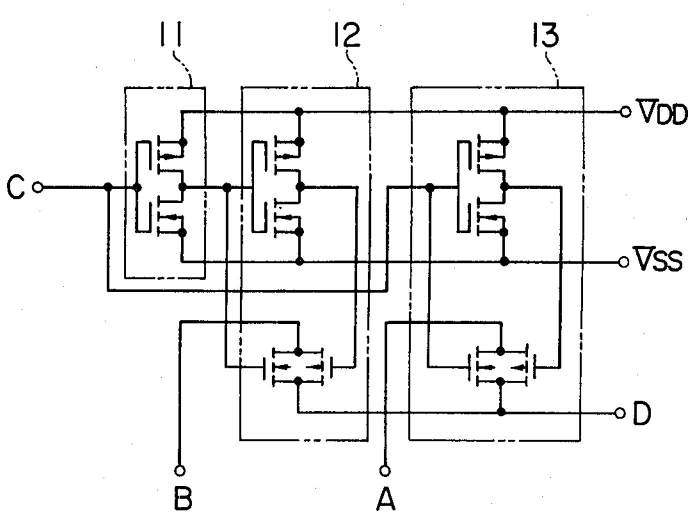
FIG. 3 is a circuit diagram showing one embodiment in which the circuit of FIG. 2 is realized in the form of integrated circuits.

In FIG. 3 there is shown one form of the circuit arrangement of FIG. 2 which is realized in the form of integrated circuits, the corresponding portions thereof being marked with the same references.

FIG. 4 shows the waveforms for driving the selected X and Y lines as fixed. The X lines, however, often undergo scanning of time division fashion (or multiplexing) as shown in the character displaying device of FIG. 1. For example, a line $X_1$ is selected for a period of $T_1$, a line $X_2$ for a period of $T_2$, . . . , and a line $X_8$ for a period of $T_8$ with the other lines non-selected for the other periods. The waveforms of FIG. 4 are applied to the X lines according to the above mentioned rules.

Figure 5:
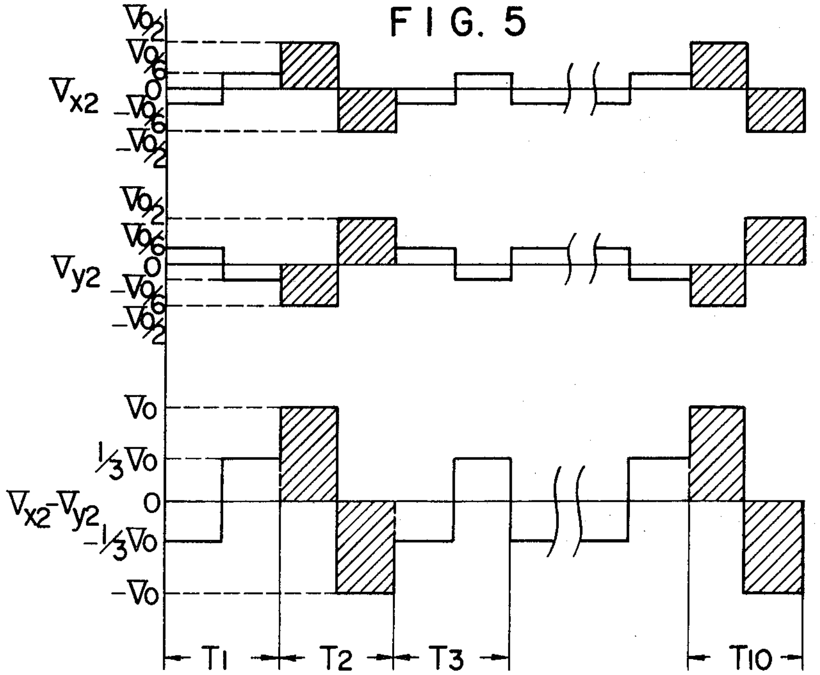

The thus applied waveform is shown in FIG. 5. In the figure, $V_{x2}$ indicates a waveform for driving the line $X_2$, which is non-selected for the period of $T_1$, selected for the period of $T_2$, and then non-selected for the periods of $T_3$ to $T_8$. Since the 8 × 8 matrix is exemplified in the embodiment, the periods $T_1$ to $T_8$ define one frame (or one field), and the line $X_2$ is selected only once a frame and again selected for a period of $T_{10}$ in the next frame. A waveform $V_{y2}$ shows the waveform for driving the Y line, and the line $Y_2$ is shown as being selected when the line $X_2$ is selected.

In some cases the line $Y_2$ is selected not only when the line $X_2$ is selected but when the other X lines are selected, but in FIG. 5 the line $Y_2$ is selected at least when the line $X_2$ is selected, and takes the driving waveform obtained for the periods of $T_2$ and $T_{10}$ as shown in hatched portions.

It will be apparent from FIG. 5 that both the lines $X_2$ and $Y_2$ receive the alternating voltage of $\pm 1/6V_0$ opposite in phase to each other for the periods of time (the periods except for $T_2$ and $T_{10}$) during which they are non-selected, while receiving the alternating voltage of $\pm \frac{1}{2}V_0$ opposite in phase to each other for the periods of time ($T_2$ and $T_{10}$) during which they are selected. Both the X and Y lines, when selected at the time of the hatched portions, becomes opposite in phase to the non-selected X and Y lines. The reason is to make the selected lines opposite in phase to the non-selected lines.

As mentioned above, in the present invention the non-selected X line receives the alternating voltage of $\mp V_0/6$, the non-selected Y line the alternating voltage of $\pm V_0/6$ opposite in phase to the alternating voltage applied to the non-selected X line, the selected X line the alternating voltage $\pm \frac{1}{2}V_0$ opposite in phase to that applied to the non-selected X line, and the selected Y line the alternating voltage of $\mp \frac{1}{2}V_0$ opposite in phase to that applied to the selected X line. Thus the alternating voltages of $\pm V_0/2$, $\pm \frac{1}{3}V_0$ and $\mp \frac{1}{3}V_0$ are, respectively, applied to the selected dot, half-selected dot and non-selected dot with the result of the averaged cross talk voltage leading to the prevention of the cross talk.

In the switching circuit including the driving switch units 3 and 5, the withstand voltage imposed on the switching element used therein is principally sufficient to be above $V_0$ because of the voltage amplitude $V_0$ at the output of the driving circuit with the result of easy realization of the large scale integrated circuits together with the other circuits. It is to be noted that the conventional withstand voltage was more than $2V_0$.

What is claimed is:

1. A method for driving a matrix type liquid crystal display element driven by the predetermined number of X lines and the predetermined number of Y lines, comprising the step of applying to a non-selected X line an alternating voltage $\mp 1/6V_0$ of one-sixth times as great as a voltage $V_0$ required for rendering the liquid crystal opaque, the step of applying to a non-selected Y line an alternating voltage $\pm 1/6V_0$ opposite in phase to the alternating voltage applied to the non-selected X line, the step of applying to a selected X line an alternating voltage $\pm \frac{1}{2}V_0$ opposite in phase to the alternating voltage applied to the non-selected X line, and the step of applying to a selected Y line an alternating voltage $\mp \frac{1}{2}V_0$ opposite in phase to the alternating voltage applied to the selected X line, whereby an alternating voltage of $\pm V_0$ is applied to a selected dot at an intersection of the selected X and Y lines to render the selected dot opaque, and an alternating voltage having an absolute amplitude value of $\frac{1}{3} V_0$ is applied to the dots other than said selected dot to prevent cross talk between the X and Y lines.

2. A method according to claim 1, wherein the X lines are scanned in a time division fashion by periodically scanning each one of the X lines as the selected X line while scanning the other X lines as the non-selected X line.

3. A device for driving a matrix type liquid crystal display element driven by the predetermined number of X lines and the predetermined number of Y lines, comprising means for applying to a non-selected X line an alternating voltage $\mp 1/6V_0$ of one-sixth times as great as a voltage $V_0$ required for rendering the liquid crystal opaque, means for applying to a non-selected Y line an alternating voltage $\pm 1/6V_0$ opposite in phase to the alternating voltage applied to the non-selected X line, means for applying to a selected X line an alternating voltage $\pm \frac{1}{2}V_0$ opposite in phase to the alternating voltage applied to the non-selected X line, and means for applying to a selected Y line an alternating voltage $\mp \frac{1}{2}V_0$ opposite in phase to the alternating voltage applied to the selected X line, whereby an alternating voltage of $\pm V_0$ is applied to a selected dot at an intersection of the selected X and Y lines to render the selected dot opaque, and an alternating voltage having an absolute amplitude value of $\frac{1}{3}V_0$ is applied to the dots other than said selected dot to prevent cross talk between the X and Y lines.

4. A device according to claim 3, further comprising a first voltage generating circuit for generating an alternating voltage of $\pm \frac{1}{2}V_0$, a second voltage generating circuit for generating an alternating voltage of $\mp 1/6V_0$ opposite in phase to the alternating voltage of $\pm \frac{1}{2}V_0$, an X line selecting circuit for selecting the X lines, an X line driving switch unit for selecting outputs from said first and second voltage generating circuits in response to an output from said X line selecting circuit to apply the selected output to a corresponding X line, a Y line selecting circuit for selecting the Y lines, and a Y line driving switch unit for selecting phase-inverted voltages of outputs from said first and second voltage generating circuits in response to an output from said Y line selecting circuit to apply the selected output to a corresponding Y line.

5. A device according to claim 3, further comprising means for scanning the X lines in a time division fashion so as to periodically scan each one of the X lines as the selected X line while scanning the other X lines as the non-selected X line.

* * * * *